May 8, 1956 G. L. HAUGEN ET AL 2,744,956

MEANS FOR IMPROVING TELEVISION INTERLACE CONTROL

Filed May 27, 1954 2 Sheets-Sheet 1

*INVENTORS.*
GLENN L. HAUGEN
GEORGE D. WOFFORD
*BY*
*Killman and Kerst*
*ATTORNEYS.*

MEANS FOR IMPROVING TELEVISION INTERLACE CONTROL

Filed May 27, 1954 2 Sheets-Sheet 2

INVENTORS
GLENN L. HAUGEN
GEORGE D. WOFFORD
BY *Killman and Kerst*
ATTORNEYS

United States Patent Office 2,744,956

Patented May 8, 1956

2,744,956

MEANS FOR IMPROVING TELEVISION INTERLACE CONTROL

Glenn L. Haugen and George D. Wofford, Baltimore, Md., assignors to Bendix Aviation Corporation, Towson, Md., a corporation of Delaware Application May 27, 1954, Serial No. 432,706

2 Claims. (Cl. 178—69.5)

This invention relates to means for improving interlace control in television circuits and particularly, to means for reducing any variations that may occur in the retrace time between fields.

In television circuits the retrace time of the vertical oscillator from field to field should be of a constant value to insure proper interlacing. When blocking and relaxation oscillator circuits are used for producing the vertical sweep signal, disturbances occurring in the oscillator input circuit during the retrace time will cause the retrace time to vary. The present invention provides a means whereby these disturbances are eliminated during this period.

An object of this invention is to provide a better interlace effect in a television receiver by eliminating in the vertical sweep oscillator input circuit during the retrace time disturbance signals of the general type produced by thermal and impulse noise and variations in sync pulses.

This and other objects are realized in systems utilizing blocking and relaxation oscillators for vertical sweeping when a pulse is obtained at the beginning of the retrace time and is coupled back into the circuit such as to eliminate all vertical oscillator input signals occurring during the retrace time.

Referring to the drawings.

Figure 1:
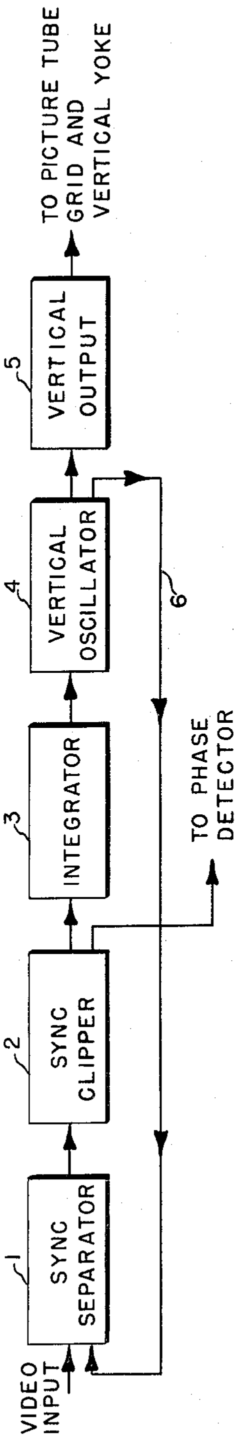
Fig. 1 is a block diagram illustrating the application of the invention to a portion of a typical television circuit.

Referring in particular to Fig. 1, a portion of a typical television circuit incorporating the invention is illustrated in block diagram form. The blocks depicted are a sync separator 1, a sync clipper 2, an integrator 3, a vertical oscillator 4, a vertical output stage 5 and a feedback loop 6. Video input signals, along with the feedback signals, are coupled into the sync separator 1. A signal is derived from the sync clipper 2 which is coupled into a phase detector (not illustrated) for use in a horizontal oscillator circuit (also not illustrated). The feedback signals are obtained from the vertical oscillator 4. The vertical output 5 provides a signal for use in a picture tube and a vertical yoke (neither of which are illustrated).

Figure 2:
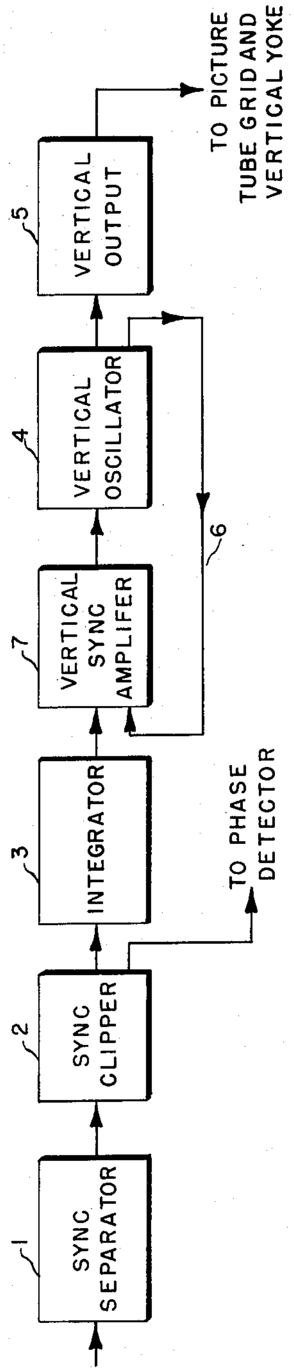
Fig. 2 is a block diagram illustrating the application of the invention to a portion of another typical television circuit.

Fig. 2 is similar to Fig. 1 except that a vertical sync amplifier 7 has been added and the feedback signals have been coupled into it instead of the sync separator 1.

Figures 3, 4:
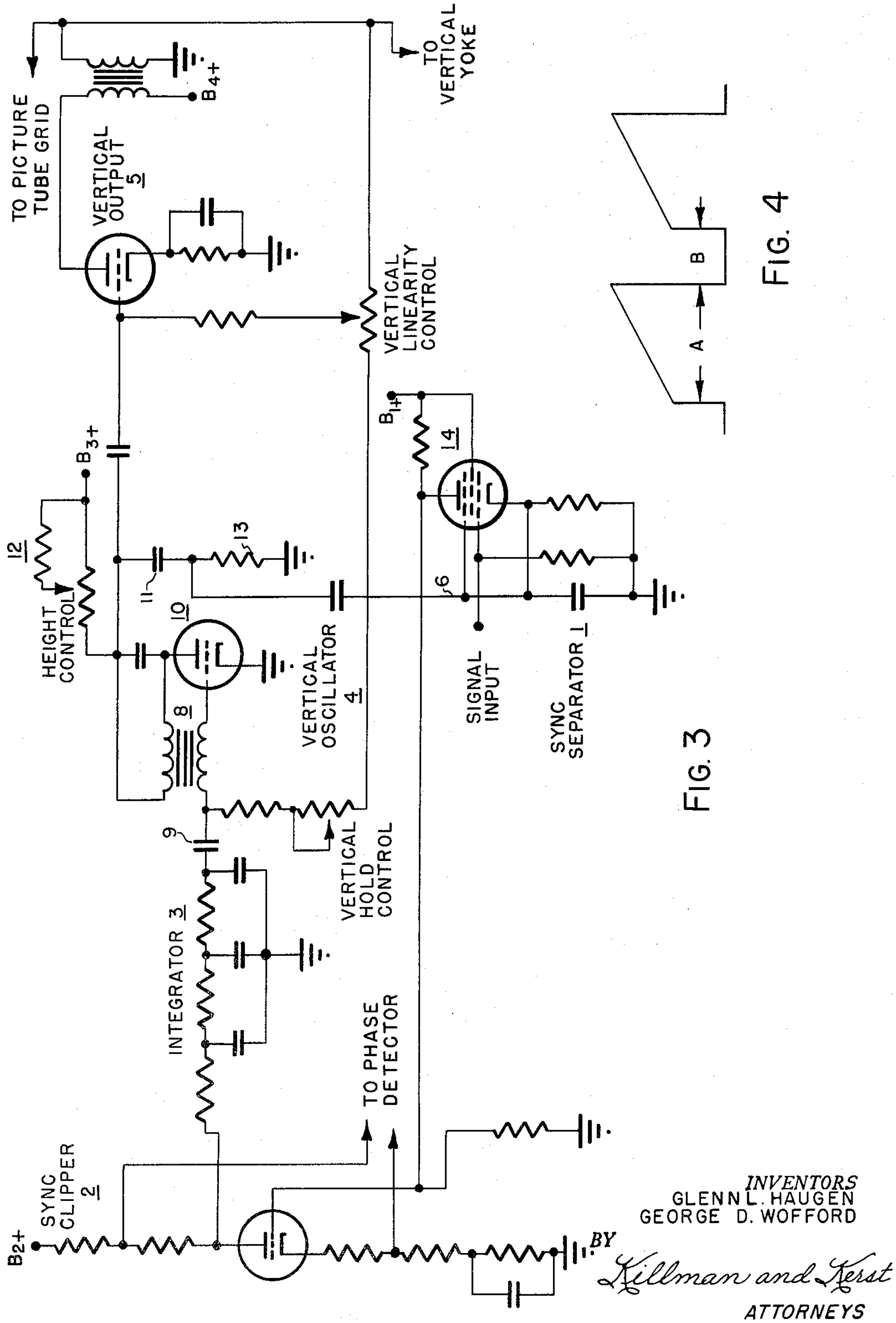
Fig. 3 is a schematic diagram illustrating a circuit conforming to the block diagram of Fig. 1.
Fig. 4 illustrates the waveform of the output of the oscillator.

In Fig. 3 a schematic diagram of a typical circuit conforming to the block diagram in Fig. 1 is depicted. The vertical oscillator 4 that is used for explanation purposes consists of a blocking oscillator which is locked into synchronism by the integrated vertical sync pulses from the integrator 3. This oscillator comprises a transformer 8, a tube 10, capacitors 9 and 11, a resistor 13 and a height control 12.

To facilitate the discussion of the operation of the vertical oscillator 4, the sync pulses from the integrator 3 will be omitted. Their effect on the operation of the circuit will be discussed later.

As initial conditions, assume the $B_3+$ supply has been disconnected and that the capacitors 9 and 11 are uncharged. When the $B_3+$ supply is connected, plate current will begin to flow. The change in current through the plate winding of the transformer 8 will induce a potential across the grid winding thereof such that the grid of the tube 10 will become positive with respect to the cathode. This in turn will cause an increase in plate current and the grid will become more positive with respect to the cathode. This is an accumulation effect and will continue until a limiting condition occurs which is caused by the circuit impedances and tube characteristics.

While the grid is positive with respect to the cathode, grid current flows such that the capacitor 9 accumulates a negative charge. The charge accumulated on the capacitor 11 is limited by the voltage drop occurring across the plate winding of the transformer 8 and the tube 10.

As the plate current limiting condition caused by the circuit impedances and tube characteristics is approached, the rate of change of the current diminishes and, as the voltage induced in the grid winding is a function of the rate of change of current, the induced voltage decreases. This phenomenon, in conjunction with the charge accumulated on the capacitor 9, drives the tube 10 toward a cut-off state. The charge on the capacitor 9 retains the tube 10 in this cut-off state until the capacitor 9 discharges through its series resistors.

While the tube 10 is in a cut-off state, the capacitor 11 is receiving a charge through the resistor 13 and the height control 12. This is illustrated in the output waveform as shown in Fig. 4 where the charge up period is represented by A.

When the tube 10 begins to conduct once again, the capacitor 11 rapidly discharges therethrough and the cycle will repeat itself. The conducting period B of the tube 10 is illustrated in Fig. 4.

The conduction time of the tube 10 is relatively small with respect to the cut-off time. This is the result of two factors. One is the rapid charge-up of the capacitor 9 as a result of the accumulative action in the circuit during the conducting time. The other is the magnitudes of the values of the resistors in series with capacitor 9. The values of these resistors are so chosen that the capacitor 9 will discharge to a level that will permit conduction to occur in a time interval such that a complete cycle will occur in approximately one-sixtieth of a second. Consequently, the oscillator will oscillate at a frequency of approximately 60 C. P. S.

When the free-running frequency of the oscillator 4 is made slightly less than 60 C. P. S., the integrated positive sync pulses at a frequency of 60 C. P. S. coupled into the grid of the tube 10 will cause the oscillator 4 to oscillate at 60 C. P. S.

When the oscillator 4 is fired, a negative pulse appears across the resistor 13 because of the capacitor 11 discharging therethrough. This negative pulse is coupled through the feedback loop 60 to the suppressor grid of a sync separator tube 14. This pulse is of sufficient amplitude and duration to cut off the tube 14 for the duration of the conducting portion of the cycle of the tube 10. Because the tube 14 is biased to cut-off during the conducting time of the tube 10 the sync and other disturbance pulses are prevented from being coupled into the vertical oscillator 4 and therefore are not present to cause variations in the retrace time.

Although only one circuit containing the invention has been illustrated, it is to be understood that many circuits utilizing the retrace time pulse for eliminating the surplusage of pulses during the retrace time are possible. Therefore, the invention should not be considered limited to the exact circuit shown in Fig. 3.

What is claimed is:

1. A television receiver circuit comprising a vertical oscillator circuit responsive to integrated synchronizing pulses in a television signal, means in the output circuit of the said oscillator circuit responsive to each cycle of operation of said oscillator to generate a voltage impulse of selected duration, said means comprising a resistor-capacitor network, means in said receiver circuit responsive to a voltage impulse of the character of said generated impulse to render said oscillator circuit insensitive to signals external thereto for the duration of said voltage impulse, and means applying said generated voltage impulse to the last named means.

2. A television receiver circuit comprising: a ground reference; a blocking oscillator circuit for vertical sweeping of the viewing tube; said blocking oscillator circuit comprising an input circuit, a vacuum tube, a capacitor, a means joining one terminal of the said capacitor to the plate of the said tube, and a second means for joining the remaining terminal of the said capacitor to the said ground reference; said second means comprising a resistor; means in the said receiver circuit responsive to the voltage generated across said resistor to prevent signals external to the said oscillator circuit from occurring therein; the last said means having an input circuit; and means joining the said second terminal of the said capacitor to the second said input circuit.

No references cited.